United States Patent
Xu (10) Patent No.: US 9,953,639 B2
(45) Date of Patent: Apr. 24, 2018

(54) VOICE RECOGNITION SYSTEM AND CONSTRUCTION METHOD THEREOF

(71) Applicant: Hua Xu, Yiwu (CN)

(72) Inventor: Hua Xu, Yiwu (CN)

( * ) Notice: Subject to any disclaimer, the term of this patent is extended or adjusted under 35 U.S.C. 154(b) by 0 days.

(21) Appl. No.: 14/909,741

(22) PCT Filed: Jun. 26, 2014

(86) PCT No.: PCT/CN2014/080833
§ 371 (c)(1),
(2) Date: Feb. 3, 2016

(87) PCT Pub. No.: WO2015/018241
PCT Pub. Date: Feb. 12, 2015

(65) Prior Publication Data
US 2016/0171978 A1 Jun. 16, 2016

(30) Foreign Application Priority Data
Aug. 4, 2013 (CN) .......................... 2013 1 0333827

(51) Int. Cl.
*G10L 15/00* (2013.01)
*G10L 15/18* (2013.01)
(Continued)

(52) U.S. Cl.
CPC .......... *G10L 15/1815* (2013.01); *G10L 15/10* (2013.01); *G10L 15/1822* (2013.01);
(Continued)

(58) Field of Classification Search
USPC .................. 704/9, 10, 231–257, 270–275
See application file for complete search history.

(56) References Cited

U.S. PATENT DOCUMENTS 6,631,346 B1 * 10/2003 Karaorman .......... G10L 15/1822
704/275
6,714,941 B1 * 3/2004 Lerman ............. G06F 17/30864
(Continued)

FOREIGN PATENT DOCUMENTS

CN 101847407 A 9/2010
CN 102237082 A 11/2011
(Continued)

OTHER PUBLICATIONS

International Publication for PCT/CN2014/080833.
International Search Report for PCT/CN2014/080833.

*Primary Examiner* — Jesse Pullias (57) ABSTRACT

Disclosed are a voice recognition system and a construction method for the voice recognition system. By way of layering the system, a general semantic recognition operation for the system is separated from a specific semantic recognition operation for an application program; and by way of classifying the application programs and abstracting out a common performance function, the system can find the application program matching the voice content semantics very efficiently and a third-party program is easily added into the existing voice recognition system. The present invention maps the performance function to a regular expression with semantic variables, so that the system can recognize more semantic expression manners with optimization of the semantic recognition. Therefore, the system can show more humanized characteristics.

5 Claims, 3 Drawing Sheets

(51) Int. Cl.
    *G10L 15/28*     (2013.01)
    *G10L 15/10*     (2006.01)
    *G10L 15/26*     (2006.01)
    G10L 15/06     (2013.01)
    G10L 15/22     (2006.01)

(52) U.S. Cl.
    CPC ............ *G10L 15/265* (2013.01); *G10L 15/28* (2013.01); *G10L 2015/0635* (2013.01); *G10L 2015/223* (2013.01)

(56) References Cited

U.S. PATENT DOCUMENTS

| | | | |
|---|---|---|---|
| 8,239,206 | B1 | 8/2012 | LeBeau et al. |
| 8,892,420 | B2 * | 11/2014 | Sun ..................... G06F 17/2785 704/254 |
| 2003/0163598 | A1 * | 8/2003 | Wilson .................... G06F 9/542 719/318 |
| 2006/0200338 | A1 * | 9/2006 | Cipollone ........... G06F 17/2735 704/4 |
| 2013/0268260 | A1 * | 10/2013 | Lundberg ................ G06F 17/28 704/8 |
| 2015/0255064 | A1 * | 9/2015 | Fujii ................... G06F 17/2755 704/257 |

FOREIGN PATENT DOCUMENTS

| | | |
|---|---|---|
| CN | 102929385 A | 2/2013 |
| CN | 103049571 A | 4/2013 |
| CN | 103400579 A | 11/2013 |

\* cited by examiner

VOICE RECOGNITION SYSTEM AND CONSTRUCTION METHOD THEREOF

BACKGROUND

1. Technical Field

The present disclosure generally relates to the field of voice recognition technology, in particular to a distributed voice recognition system and a construction method.

2. Description of Related Art

Traditionally a voice recognition system provides voice recognition for input voice through a voice recognition module in a client or a cloud server, and the semantic recognition process is based on a pre established syntax analysis tree to identify the speech content and call a corresponding application program to complete the operation, such as SIRI, GOOGLE NOW.

The traditional voice recognition system described above intends to establish a general system that can fully understand people's intention. The execution of the identified operations generally occurs in a pre-established speech recognition system database or application. This approach can better control the scope of the operation of the semantic recognition and make the semantic recognition more close to people's understanding of speech. But there are a large number of third party applications on the system, this approach makes it impossible to perform operations against third party applications, even if these operations have been identified by the system. At the same time, the user is concerned about the different sites, because of the different data sources, the results from the same search requests are also different. In addition, in order to allow the third-party application to use the speech recognition function, a simple speech recognition module needs to be added or a cloud voice development library of the third-party needs to be applied, and then regular expressions and corresponding operations are uploaded to the semantic recognition library. In this way, the semantic recognition database of the third party cannot be found by other programs, and the operation can only occur in the third party application or database.

SUMMARY

The purpose of the invention is to provide a voice recognition system and its construction method that the traditional voice recognition system can be applied seamlessly to the existing applications execution of the user client, and make the semantic recognition with more personalized features that set the scope of the operation of the semantic recognition according to the user's preferences. In addition, the semantic recognition library of third-party applications can be found by other programs and receives operation requests from other applications.

In order to solve the above technical problems, in one embodiment, the present invention provides a voice recognition system including a voice recognition module and a registration centre for storing information of application programs installed on the voice recognition system and establishing a multi fork tree structure of the voice recognition system, the registration centre including:

a root node for storing a plurality of regular expressions with semantic variables, to find and open files or the application programs;

a plurality of class nodes, each for storing a plurality of regular expressions with semantic variables which are used to describe common behaviors of a series of the application programs, and mapping the regular expressions to a public function set;

a plurality of application program nodes each for representing one of the application programs that belongs to one of the class nodes and inherits the public function set of the class node; and a plurality of application program internal nodes, each for storing a plurality of regular expressions used in the application program, and a corresponding function set.

Preferably, each application program node comprises a plurality of regular expressions with semantic variables that are not used in the class nodes and mapped to a specific function set.

The corresponding operations of the regular expressions of the root node are mainly used to find or open files and the application programs or call unique application programs provided by the system (for example, telephony application program, messaging application program). Each class node is mainly used to locate the class to which the target application is located, in order to quickly find out the location of the application node that performs the operation that is semantically recognized. When the class nodes cannot recognize the semantic meaning of the voice content, the content will be given to all the application nodes for semantic recognition. For security, voice content from the root node will not be transmitted to the application program internal nodes.

The variables of each regular expression are semantic variables, which are mainly used to determine whether given variables are within a specified semantic scope or not. Among the semantic variables, the semantic scope can be derived from common sense, and can also be a name set of the application programs installed on the system. If the specified semantic scope is relatively small, it can be given by enumeration. The invention constructs the syntax analysis tree by the regular expressions to complete the semantic recognition of the input speech content, and each regular expression corresponds to a function call. After determining a grammatical structure that can be parsed correctly, a plurality of linguistic expressions for this grammatical structure will be added together as the semantic recognition database updates. Corresponding regular expressions of the new added linguistic expressions will be mapped to a same function, thus establishing a more humane semantic recognition database, also help to improve the accuracy of voice recognition.

In order to prevent the function name of the application program and the function name of the class node conflict, application specific functions will not be allowed to use the public function name of the class node.

In another embodiment, the regular expressions can have no semantic variables, which can be seen as values of the semantic variables of the regular expressions are null.

In another embodiment, the present invention provides a construction method, comprising:

step S01: the application programs submitting information to the registration centre;

step S02: the voice recognition system receiving a voice input by a user, and the voice recognition module converting voice content into text form;

step S03: the voice recognition system determining whether the voice content matches with the regular expressions with semantic variables of the root node or not, wherein if the voice content matches with the regular expressions with semantic variables of the root node, a first function is called; and wherein if the voice content does not match with the regular expressions with semantic variables of the root node, a next step is performed;

step S04: the class nodes receiving the voice content, wherein if the voice content does not match with the regular expressions with semantic variables of any class node, step S05 is performed; if the voice content matches with the regular expressions with semantic variables of one class node, step S07 is performed;

step S05: the voice content being delivered to all the application nodes, if the voice content matches with the regular expressions with semantic variables of one of application program nodes, step S07 is performed; if the voice content does not match with the regular expressions with semantic variables of any application program nodes, step S06 is performed;

step S06: the voice recognition system discarding the voice content or inputting the voice content into public search engine for a wide range of search;

step S07: the voice recognition system selecting a called application program and writing a second function including a name and variables corresponding to the regular expression with semantic variables into a private directory of the selected application program installed on the system; and step S08: the system starting the selected application program, wherein the voice recognition system determines whether the private directory of the selected application program has the name and variables of the function or not before loading the selected application program, and wherein if the private directory of the selected application program has the name and variables of the second function, the selected application program loads the name and variables of the second function from the private directory and calls the second function; and wherein if the private directory of the selected application program has no name and the variables of the second function, a default initial page is loaded.

In order to facilitate access to services that are bound to an account, the user can enter an account name and password of the application program in advance. At the same time, a specific return interface can be set up for each function call inside the application program, in order to return the results of the call to the user.

Preferably, the submitted information in step S01 comprises names and identifiers of the application programs, the class information of the application program, and a plurality of specific regular expressions with semantic variables and the corresponding function call sets of the application program nodes and some information from the application program internal nodes.

The identifier of the application program points to a detail address of a system directory where a startup program of the application program is located. The voice recognition system starts the applicant program by opening the system directory that the identifier of the application program points to.

Preferably, in step S07, a priority of each application program node that belongs to a class node is set based on the user's settings, wherein if the regular expressions matching with the voice content does not designate that one of the application program nodes call the second function, a higher priority application program node is selected to call the second function.

In light of the user's settings, in the case the regular expressions of a class node matching the voice content does not designate that one of the application program nodes executes a function call, all application program nodes of the class node calls the function corresponding to the regular expressions and the results are come to a page. In the case the application program returns the result of calling the function to the system, and the system comes the results to a page and does not returns the results to the page pre-set by the application program.

Preferably, in step S07, only the selected application program and the system can write data into the private directory of the selected application program installed on the system, while only the selected application program can read the name and the variables of the second function that are stored in the private directory.

At the same time the account name and password input by the user are stored in the private directory. A location of the private directory is marked by the identifier of the application program. A name of the private directory is automatically generated by the system in light of the name of the application program because the private directory and a start program are stored in the same directory of the system. The data written into the private directory can be saved in XML format to facilitate to be accessed by the application program.

Preferably, in step S08, after loading the application program, further comprising the following steps:

step S0801: the voice recognition system receiving voice input by the user, and the voice recognition module converting voice content into text form;

step S0802: the voice recognition system determining whether the voice content matches with the regular expressions of the application program internal nodes, wherein if the voice content matches with the regular expressions of the application program internal nodes, a corresponding function is called, and wherein if the voice content does not match with the regular expressions of the application program internal nodes, a next step is performed;

step S0803: the voice content being transmitted to a selected application program node, wherein if the voice content matches with the regular expressions of the selected application program node, a corresponding function is called, and wherein if the voice content does not match with the regular expressions of the selected application program node, a next step is performed;

step S0804: the voice content being transmitted to a class node of the selected application program node, wherein if the voice content matches with the regular expressions of the class node of the selected application program node, step S0810 is performed, and wherein if the voice content does not matches with the regular expressions of the class node of the selected application program node, a next step is performed;

step S0805: the voice content being transmitted to all brother nodes of the selected application program node, wherein if the voice content matches with the regular expressions of one of the brother node of the selected application program node, step S0810 is performed, and wherein if the voice content does not matches with the regular expressions of any brother nodes of the selected application program node, a next step is performed;

step S0806: the voice content being transmitted to the root node, wherein if the voice content matches with the regular expressions of the root node, a corresponding function is called, and wherein if the voice content does not matches with the regular expressions of the root node, a next step is performed;

step S0807: the voice content being transmitted to the class nodes, wherein if the voice content matches with the regular expressions of the class nodes, step S0808 is performed, and wherein if the voice content does not matches with the regular expressions of the class nodes, step S0810 is performed;

step S0808: the voice content being transmitted to the application program nodes and recognized by the application program nodes, wherein if the voice content matches with the regular expressions of the application program nodes, step S0810 is performed, and wherein if the voice content does not matches with the regular expressions of the application program nodes, step S0809 is performed;

step S0809: the system discarding the voice content or inputting the voice content into public search engine for a wide range of search;

step S0810: the voice recognition system selecting a called application program and writing a function corresponding to the regular expressions with semantic variables into a private directory of the selected application program installed on the system; and step S0811: the system starting the selected application program, wherein the system determine whether the private directory of the selected application program has a function and corresponding variables or not before loading the selected application program, and wherein if the private directory of the selected application program has a function and corresponding variables, the selected application program loads the function and variables from the private directory and calls a corresponding function; and wherein if the private directory of the selected application program has no the function and variables, a default initial page is loaded.

The beneficial effects of the present invention are:

The invention can complete the construction of a semantic recognition module of the voice recognition system by using information submitted by application programs which need to be applied to the registration centre. The voice recognition system can quickly locate the required application programs by the semantic recognition module based on multi fork tree structure, and the third party application programs can be easily added into the existing voice recognition system. Through regular expressions with semantic variables to complete the semantic recognition of input voice content, the voice recognition system can recognize more humane voice content by mapping regular expressions corresponding to more linguistic expressions to a same function. The application program does not occupy the thread when the voice recognition system recognizes the semantic by writing functions and variables of the application program into a private directory, resulting in improving the performance of the system, while preventing input voice content of the user from being tapped by other threads. In addition, the voice recognition system provides a personalized service for users by setting the priority of the application program nodes.

BRIEF DESCRIPTION OF THE DRAWINGS

The detail description of the present invention is as following by combination of drawings and detailed description.

DETAILED DESCRIPTION

Figure 1:
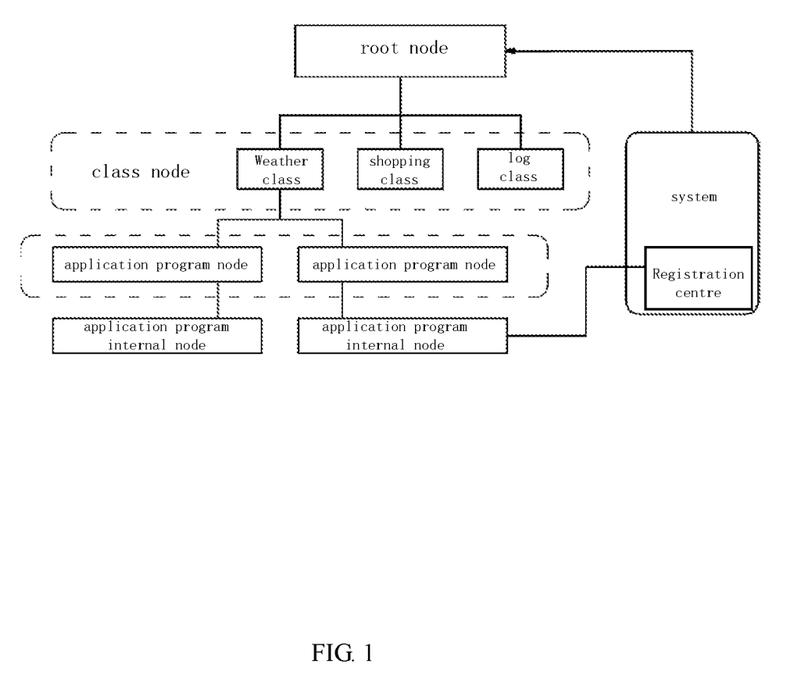
FIG. 1 is schematic diagram of a system of a registration centre of the present invention.
Figure 2:
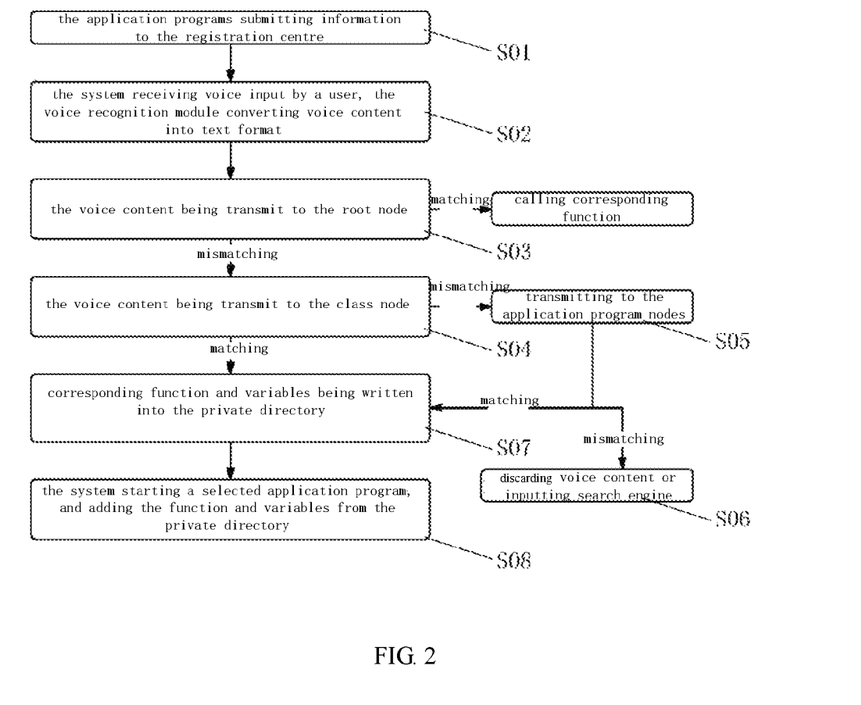
FIG. 2 is a flowchart of a method for processing voice input.

Referring to FIG. 2, when a third-party application program needs to be added to the voice recognition system, firstly it needs to submit the following information to a registration center of the voice recognition system (S01): A name and an identifier of the application program, the class information of the application program, and a plurality of specific regular expressions with semantic variables and the corresponding functions of the application program nodes and some information from the application program internal nodes. The identifier of the application program points to a detailed address of a system directory where a startup program of the application program is located. The voice recognition system starts the applicant program by opening the system directory that the identifier of the application program points to. The registration centre is a multi fork tree including a root node, a plurality of class nodes, a plurality of application program nodes, and a plurality of application program internal nodes (referring to FIG. 1). The root node stores a plurality of regular expressions with semantic variables, to find and open files or application programs that are stored in the voice recognition system. Each class node stores a plurality of regular expressions with semantic variables which are used to describe common behaviors of a series of applications programs, and maps the regular expressions to a public function set. Each application program node representing one of the application programs that belongs to one of the class nodes and inherits the public function set of the class node. Each application program internal node stores a plurality of regular expressions used inside the application, and a corresponding function set. Only after entering the application programs, the system can use the regular expressions of the application program internal node to match voice content.

The corresponding operations of the regular expressions of the root node are mainly used to find or open files or the application programs or call unique application programs provided by the system (for example, telephony application program, messaging application program). Each class node is mainly used to locate a class to which the target application is located, in order to quickly find out the location of the application node that performs the operation that is semantically recognized. When the class nodes cannot recognize the semantic meaning of the voice content, the content will be given to all the application nodes for semantic recognition. For security, the voice content from the root node will not be transmitted to the application program internal nodes.

According to information submitted by the application program to the registration center, information of a new application program is added to an application program node which is a sub node of a class node. Simultaneously, a plurality of specific regular expressions with semantic variables and a corresponding function set of the application program node are also written into the corresponding application program node. The application program internal node is a sub node of the application program node, and it stores a plurality of specific regular expressions with semantic variables and a corresponding function set applied inside the application program.

The variables of each regular expression are semantic variables, which are mainly used to determine whether given variables are within a specified semantic scope or not, wherein the specified semantic scope can be derived from common knowledge, and can also be a name set of the application programs installed on the system. If the specified semantic scope is relatively small, it can be given by enumeration. In a commercial application program, the system can get examples of the semantic variable by machine learning, for example, a plurality of qualifiers are used to describe commodity names. In a chat application program, a local application program submits names in a contact list as a semantic variable to the registration center after the user is connected to a network. The invention constructs the syntax analysis tree by the regular expressions to complete the semantic recognition of the input speech content, and each regular expression corresponds to a function call. After determining a grammatical structure that can be parsed correctly, a plurality of presentations for this grammatical structure will be added together as the semantic recognition database updates. Corresponding regular expressions of the new added linguistic expressions will be mapped to a same function, thus establishing a more humane semantic recognition database, also help to improve the accuracy of voice recognition.

In order to prevent the function names of the application programs and the function names of the class nodes conflict, application's unique functions will not be allowed to use the name of the public function sets of the class nodes.

When the voice recognition system receives voice input by the user, the input voice will be transformed into text format by a voice recognition module (S02). The voice recognition system determines whether the input voice content matches with the regular expressions with semantic variables of the root node or not (S04), if the input voice content matches with the regular expressions with semantic variables of the root node, a corresponding function is called. If the input voice content does not match with the regular expressions with semantic variables of the root node, the input voice content is submitted to the class nodes (S04). If the input voice content does not match with the regular expressions with semantic variables of the class nodes, the input voice content is submitted to all application program nodes to analyze (S05). If the input voice content matches with the regular expressions with semantic variables of one of the application program nodes, the voice recognition system writes a function including name and variables corresponding to the matching regular expression into a private directory of the application program retained by the system (S07), and starts the matching application program. If the voice content exactly matches with the regular expressions of the class nodes, and the matching regular expression does not specify one of the application program nodes to call a function, the system selects a random application program node and writes a function including name and variables corresponding to the matching regular expression into the private directory of the selected application program (S07). Preferably, the user can set the priority of the application program node that is a sub node of the class node. In the case that the application program nodes have the same probability of being selected by the class nodes to call the function corresponding to the regular expressions, a higher priority application program will be selected by the voice recognition system. Finally, if the regular expressions with semantic variables of all nodes do not match with the input voice content, the input voice content is discarded or sent to a public search engine for a wider range of search (S06).

The system starts the selected application program, and will determine whether the private directory of the selected application program has a function including name and corresponding variables or not before loading the application program, wherein if the private directory of the selected application program has a function including name and corresponding variables, the application program will get the name and variables of the function from the private directory, and calls a corresponding function. If the private directory of the selected application program has not any function information, the application program loads a default initial page (S08). In order to facilitate access to services that are bound to an account, the user can enter an account name and password of the application program in advance and save the account name and password in the private directory of the application program set by the voice recognition system. At the same time, a specific return interface can be set up for each registered function call inside the application program, in order to return the results of the call to the user, and guides the user to the application program internal node.

After starting the application program, firstly the voice content input by the user is converted into text format, after that the voice recognition system determines whether the voice content matches with the regular expressions of the application program internal node or not. If the voice content matches with the regular expressions of the application program internal node, a corresponding function is called. If the voice content does not match with the regular expressions of the application program internal node, the voice content is submitted to the selected application program node. The voice recognition system determines whether the voice content matches with the regular expressions of the application program node or not. If the voice content matches with the regular expressions of the application program node, a corresponding function is called. If the voice content does not match with the regular expressions of the application program node, the voice content is submitted to a class node of the selected application program node. If the voice content matches with the regular expressions of the class node, the function with variables are written into the private directory of the selected application program, and the selected application program are started. If the voice content does not match with the regular expressions of the class node, the voice content is transmitted to brother nodes of the application program node. If the voice content matches with the regular expressions of the brother nodes of the application program nodes, the function with variables are written into the private directory of the brother node of the application program node. If the voice content does not match with the regular expressions of any brother nodes of the application program nodes, the voice content is transmitted to the root node. If the voice content matches with the regular expressions of the root node, the system switches to a main interface and calls a corresponding function. The following steps are similar to the previous steps, but the voice content will not be passed to the class node of the application program internal node to analysis. As a recipe, if the voice content can be recognized by the class node of the application program internal node, and the recognized variables are not be pointed to an application program node, the current application program is acted as the default scope of the function.

Figure 3:
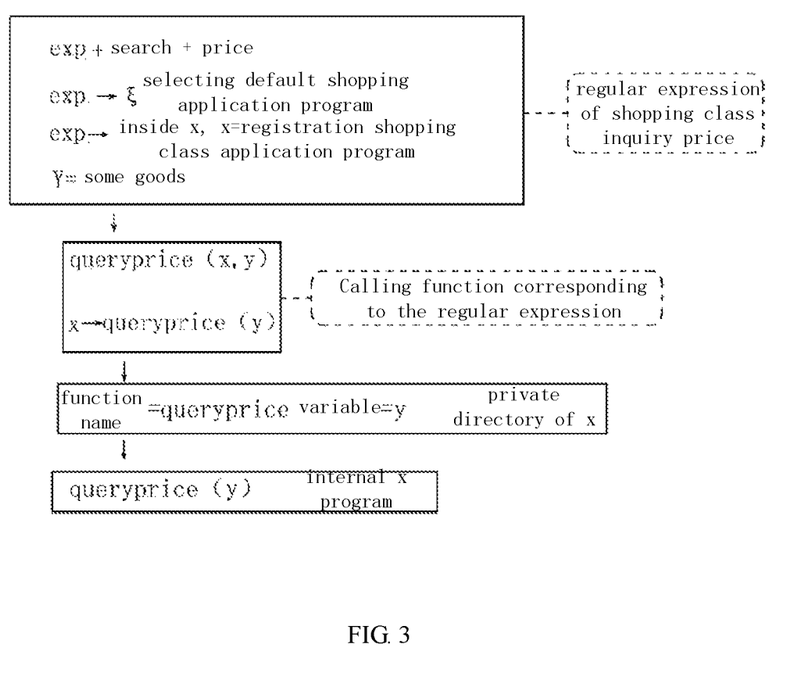
FIG. 3 is a diagram of a shopping application program which executes enquiry function of commodity price.

Referring to FIG. 3, a shopping class application program is further described. When the voice content matches with the regular expressions of the shopping class application program, a corresponding application program is selected to call in light of the variables stored in X and Y, and a function including name and variables are written into a private directory of the corresponding application program, wherein X represents a registered shopping class application's program, and Y represents goods's name. The startup program of the application program is found in light of an identifier submitted by the application program X. The application program reads the name and variables of the function in the private directory, and calls the corresponding function. Of course, some regular expressions include a plurality of variables, the method of the present invention can be implemented as long as the semantic scope of each variable is defined and the regular expressions with variables are mapped to the corresponding function calls.

The technology solution described above is applied to mobile devices, such as IOS and Android, but also suitable for web search and intelligent home voice management. When the technology solution is used to search the web, a module is built for the semantics recognition of each web page. After an input voice content matches with a regular expression, an operation of a web page is called. If more than one web site matches with the input content, the results from the matching function of these web sites are aggregated to a web page. The intelligent home voice management can make devices in a dormant period when they are not working, the devices are started when the relevant device can perform the operation asked by the user. The present invention can make a new equipment and a new website to be easily added into the existing voice recognition system.

If the voice recognition and resolution ability of the device is limited, the registration center will be put into a cloud server. The identifier of the application program will represent the URL address of the application program. The operating system of the present invention can be a local operating system, and can also be a cloud operating system where these application programs are installed in different physical locations.

By way of layering the system, a general semantic recognition operation for the system is separated from a specific semantic recognition for the application programs, and by way of classifying the application programs and abstracting out some common functions, the system can find the application program matching the voice content semantics very efficiently and a third-party application is easily added into the existing voice recognition system. The present invention maps a common performance function to many regular expressions with semantic variables, so that the system can recognize more personalized expressions with the optimization of the semantic recognition. Therefore, the system can show more humanized characteristics.

The present invention provides a voice recognition system and its construction method that can add the information of the recognized function into the private directory of a application program built by the voice recognition system, so that the application program does not occupy the thread when the voice recognition system recognizes the voice content. It also can prevent the input voice content from being tapped by other threads.

The embodiments described above are merely preferred ones of the present disclosure but are not limitations to the protection scope of the present disclosure, and any variations or substitutions easily devised by those skilled in the art without departing from the spirit of the present disclosure fall within the scope of the protection. Therefore, the protection scope of the present disclosure shall be subject to that specified by the appended claims.

What is claimed is:

1. A construction method based on a voice recognition system, the voice recognition system comprising a voice recognition module and a registration centre for storing information of application programs installed on the voice recognition system and establishing a multi fork tree structure of the voice recognition system, the registration centre comprising a root node for storing a plurality of regular expressions with semantic variables to find and open files or the application programs, a plurality of class nodes each for storing a plurality of regular expressions with semantic variables which are used to describe common behaviors of a series of the application programs and mapping the regular expressions to a public function set; a plurality of application program nodes each for representing one of the application programs that belongs to one of the class nodes and inherits the public function set of the class node, and each application program node comprises a plurality of regular expressions with semantic variables that are not used in the class nodes and mapped to a specific function call set;

and a plurality of application program internal nodes for storing a plurality of regular expressions used in the application programs and corresponding function sets, the method comprising:

step S01: the application programs submitting information to the registration centre;

step S02: the voice recognition system receiving a voice input by a user, and the voice recognition module converting voice content into text form;

Step S03: the voice recognition system determining whether the voice content matches with the regular expressions with semantic variables of the root node or not, wherein if the voice content matches with the regular expressions with semantic variables of the root node, a first function is called; and wherein if the voice content does not match with the regular expressions with semantic variables of the root node, a next step is performed;

step S04: the class nodes receiving the voice content, wherein if the voice content does not match with the regular expressions with semantic variables of any class node, step S05 is performed;

and wherein if the voice content matches with the regular expressions with semantic variables of one class node, step S07 is performed;

step S05: the voice content being delivered to all application nodes wherein if the voice content matches with the regular expressions with semantic variables of one of application program nodes, step S07 is performed; and wherein if the voice content does not match with the regular expressions with semantic variables of any application program nodes, step S06 is performed;

step S06: the voice recognition system discarding the voice content;

step S07: the voice recognition system selecting a called application program and writing a second function comprising a name and variables corresponding to the regular expressions with semantic variables into a private directory of the selected application program installed on the voice recognition system; and step S08: the system starting the selected application program, wherein the voice recognition system determines whether the private directory of the selected application program has the name of the second function or not before loading the selected application program, and wherein if the private directory of the selected application program has the name and variables of the second function, the selected application program loads the name and variables of the second function from the private directory and calls the second function; and wherein if the private directory of the selected application program has no the name and the variables of the second function, a default initial page is loaded.

2. The construction method of claim 1, wherein the submitted information in step S01 comprises names and identifiers of the application programs, class information of the application programs, and a plurality of specific regular expressions with semantic variables and corresponding function call sets of the application program nodes and some information from the application program internal nodes.

3. The construction method of claim 1, wherein in step S07, a priority of each application program node that belongs to one of the class nodes is set based on the user's settings, wherein if the regular expressions matching with the voice content does not designate that one of the application program nodes call the second function, a higher priority application program node is selected to call the second function.

4. The construction method of claim 1, wherein in step S07, only the selected application program and the voice recognition system can write data into the private directory of the selected application program installed on the voice recognition system, while only the selected application program can read the name and the variables of the second function that are stored in the private directory.

5. A voice recognition system, comprising:
   a voice recognition module for converting voice content input by a user into text form;
   a plurality of application programs for executing voice commands; and
   a registration centre for storing information of the application programs, the registration centre comprising:
   a plurality of class nodes each for storing a plurality of regular expressions with semantic variables which are used to describe common behaviors of a series of the application programs and mapping the regular expressions to a public function set;
   wherein each of the application programs belongs to one of the class nodes and inherits the public function set of the class node, and is added into the voice recognition system via submitting a name, class information, and an identifier of each of the application programs to the registration centre, and wherein when text content output by the voice recognition module matches with the regular expressions with semantic variables of one class node, the voice recognition system selects and starts one of the application programs to execute an inherited public function set;
   wherein the registration centre establishes a multi fork tree structure of the voice recognition system, and the voice recognition system further comprising:
   a root node for storing a plurality of regular expressions with semantic variables to find and open files or the application programs;
   a plurality of application program nodes for representing the application programs, and each application program node comprises a plurality of regular expressions with semantic variables that are not used in the class nodes and mapped to a specific function call set; and
   a plurality of application program internal nodes for storing a plurality of regular expressions used in the application programs, and corresponding function sets.

* * * * *